United States Patent [19]
Knoll

[11] 3,790,936
[45] Feb. 5, 1974

[54] FLUID LEVEL DETECTOR

[75] Inventor: William C. Knoll, Turbotville, Pa.

[73] Assignee: GTE Sylvania Incorporated, Seneca Falls, N.Y.

[22] Filed: Apr. 27, 1972

[21] Appl. No.: 247,971

[52] U.S. Cl.............. 340/244 E, 340/59, 340/285
[51] Int. Cl..................... B60g 1/00, G08b 21/00
[58] Field of Search ................. 340/244 E, 244 C

[56] References Cited
UNITED STATES PATENTS
3,461,447  8/1969  Marouby..................... 340/244 E
3,689,883  9/1972  Hill........................... 340/244 C Primary Examiner—Thomas B. Habecker
Attorney, Agent, or Firm—Norman J. O'Malley; Robert E. Walrath; Thomas H. Buffton

[57] ABSTRACT

A shift in liquid level of apparatus having dual containers each including an electrically conductive liquid is indicated by activation of a voltage divider circuit coupled to each container and to a switching means which activates a first electron device and, in turn, activates a second electron device having a load circuit with an indicator device and a feedback circuit for effecting saturated conduction of the electron devices.

10 Claims, 1 Drawing Figure

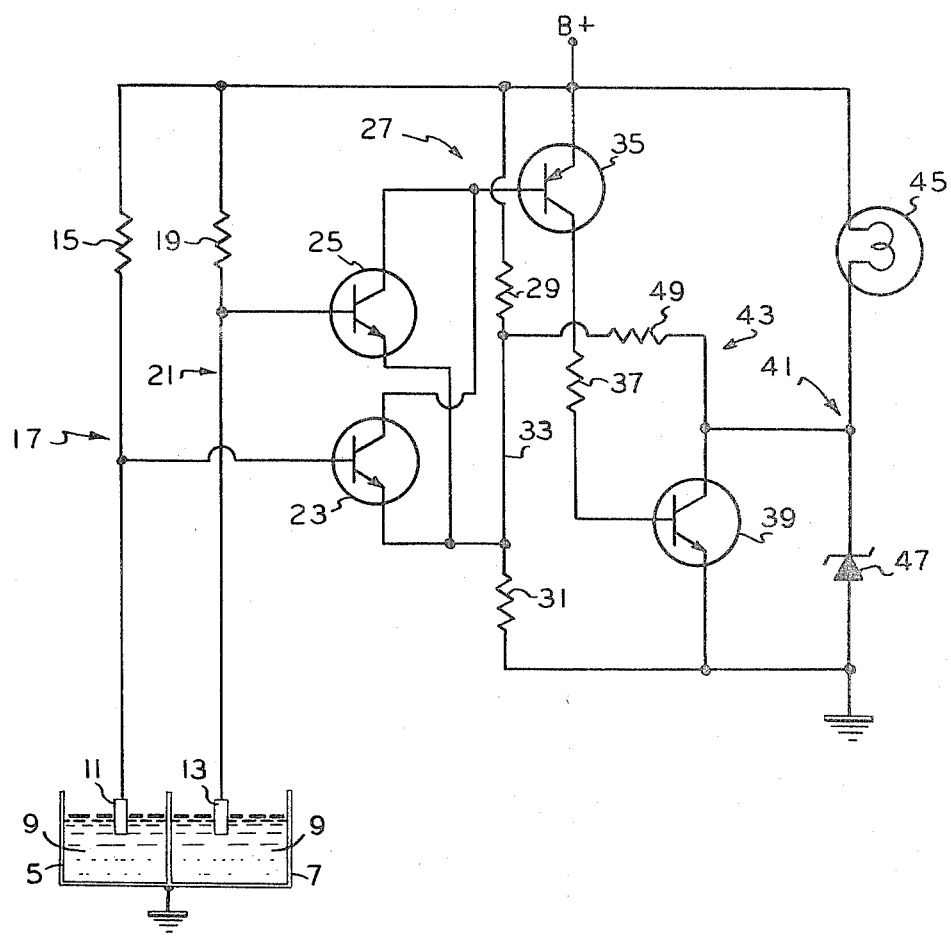

3,790,936

FLUID LEVEL DETECTOR

BACKGROUND OF THE INVENTION

In the area of liquid level sensing devices, mechanical or float systems are probably the most popular. Also, thermal or heat sink systems wherein the fluid serves as a heat conductor are frequently employed for activating some form of light or indicating device. Moreover, one known form of electronic liquid level sensor apparatus included a pair of probes with each one coupled to a switching means whereby a shift in resistance of the probe activates one of the switches to provide a signal. This signal is amplified to activate a lamp or indicator.

Although each of the above techniques has been and still is widely employed in numerous applications, it has been found that there are certain applications wherein an electronic system is preferred. For example, vehicle braking systems do not appear to be particularly suited to mechanical techniques nor thermal techniques due to the adverse environmental conditions associated with either floats or temperature-sensitive devices.

Further, the only known electronic system suitable for use in detecting the level of brake fluid in a vehicle braking system utilizes a pair of probes in a pair of containers having brake fluid therein. A shift in probe resistance provides an amplified signal for activating an indicating device. However, it has been found that the apparatus exhibits a tendency to cause an undesirable flickering indication as the resistance value and liquid level vary ever so slightly.

OBJECTS AND SUMMARY OF THE INVENTION

An object of the present invention is to provide improved liquid level indicating apparatus. Another object of the invention is to provide an enhanced electronic liquid level indicating apparatus. Still another object of the invention is to provide improved liquid level indicating apparatus for a vehicle braking system. A further object of the invention is to provide a low current highly dependable electronic liquid level indicating apparatus.

These and other and further objects, advantages and capabilities are achieved in one aspect of the invention by liquid level indicating apparatus having dual liquid containers with a voltage divider circuit including a probe coupled to each container and to a switching means and the switching means coupled to a first electron device which is coupled, in turn, to a second electron device having an output circuit containing a signal indicator and a feedback circuit whereby a reduction in liquid level causes conduction of a switching means and the first and second electron devices to provide a signal to the indicator and to the feedback circuit to cause increased conduction of the switching means and electron devices.

BRIEF DESCRIPTION OF THE DRAWING

The sole FIGURE is a schematic illustration of a preferred form of electronic liquid level indicator apparatus.

DESCRIPTION OF THE PREFERRED EMBODIMENT

For a better understanding of the present invention, together with other and further objects, advantages and capabilities thereof, reference is made to the following disclosure and appended claims in connection with the above-described drawing.

Referring to the drawing, a liquid level indicating apparatus includes a first and second container 5 and 7 electrically coupled to a potential reference level such as circuit ground. An electrically conductive liquid, such as brake fluid 9, is disposed within the containers 5 and 7 and first and second probes 11 and 13 are positioned within the first and second containers 5 and 7.

The first probe 11 is coupled via a resistor 15 to a potential source B+ thus forming a first voltage divider circuit 17. The second probe 13 is also coupled via a resistor 19 to the potential source B+ forming a second voltage divider circuit 21.

A first switching means 23, in the form of a transistor in this instance, is coupled to the first voltage divider circuit 17 while a second switching means 25 is coupled to the second voltage divider circuit 21. A voltage divider means 27 includes first and second resistors 29 and 31 series connected intermediate the potential source B+ and the potential reference level. The first and second switching means 23 and 25 are coupled to the junction 33 of the series connected resistors 29 and 31.

A first electron device 35 is coupled to the potential source B+ and to each of the first and second switching means 23 and 25. A current limiting resistor 37 couples the first electron device 35 to a second electron device 39. The second electron device 39 is connected to the potential reference level and has an output electrode coupled to a load circuit 41 and to a feedback circuit 43. The load circuit 41 includes an indicating device 45, such as a lamp, coupled to the potential source B+ and a zener diode 47 coupled to the potential reference level. Also, the feedback circuit 43 includes an impedance in the form of a resistor 49 coupling the output electrode of the second electron device 39 to the junction of the voltage divider means 27.

As to operation, a reduction in the level of the electrically conductive liquid 9 causes an increase in the resistance of one of the probes, the first probe 11 for example, whereupon the potential available at the first voltage divider circuit 17 and applied to the first switching means 23 is increased. This increased potential causes conduction of the first switching means 23 decreasing the output potential and initiating conduction of the first electron device 35.

Upon conduction of the first electron device 35, current is applied to the base of the second electron device 39 and conduction thereof is effected. Thus, these electron devices, 35 and 39, comprise a current amplifier means. Conduction of the second electron device 39 lowers the potential of the output electrode to a value approaching the potential reference level or circuit ground where-upon the indicating device 45 is, in essence, disposed intermediate the potential source B+ and potential reference level and serves to provide a visual indication of the change in fluid level. MOreover, the zener diode 47 serves as a conductive path to the potential reference level for undesired transient spikes of potential.

Further, the reduced potential appearing at the output electrode of the second electron device 39 is coupled by way of the feedback circuit 43, which includes the resistor 49, to the junction 33 of the series connected resistors 29 and 31 of the voltage divider means 27. Thus, the potential appearing at the emitter electrode of the conducting switching means, either 23 or 25, is reduced whereupon a saturated conduction condition is attained. Also, the saturated conduction condition of the switching means, either 23 or 25, is transferred into a saturated conduction condition in the first and second electron devices 35 and 39.

Additionally, the reduced potential fed back to the switching means 23 or 25 serves to provide a hysteresis capability whereupon the resistance of the probe must be reduced below the original initiating value in order to turn off the switching means, 23 or 25. Thus, a positive "latching" action is achieved and undesired flickering of the indicator device 45 is substantially eliminated.

It should be noted that there has been provided unique electronic liquid level indicator apparatus which is simple and inexpensive but provides dependable operation. The apparatus provides a latching or hysteresis capability which greatly enhances employment in numerous systems and particularly in vehicle braking systems.

While there has been shown and described what is at present considered the preferred embodiment of the invention, it will be obvious to those skilled in the art that various changes and modifications may be made therein without departing from the invention as defined by the appended claims.

What is claimed is:

1. A liquid level indicator apparatus for a vehicle braking system having first and second containers electrically coupled to a potential reference level and having electrically conductive brake fluid therein comprising:
   a potential source;
   first and second probes each coupled to said potential source and positioned within one of said containers for developing first and second resistance values in accordance with the level of said brake fluid;
   voltage divider means coupling said potential source to a potential reference level;
   first and second switching means coupled to said first and second probes respectively and to said voltage divider means, and having an output; and
   current amplifier means coupled to said switching means output and coupled to a load circuit having a signal indicator and via a feedback circuit to said voltage divider means whereby a shift in fluid level causing an increased resistance value of one of said probes is accompanied by activation of said signal indicator and of said feedback circuit to effect a saturation conduction condition of said current amplifiers.

2. The liquid level indicator apparatus of claim 1 wherein each of said first and second probes is coupled by a resistor to said potential source.

3. The liquid level indicator apparatus of claim 1 wherein said voltage divider means is in the form of first and second resistors series connecting said potential source to said potential reference level with said first and second switching means coupled to the junction of said series connected resistors.

4. The liquid level indicator apparatus of claim 1 wherein each of said first and second switching means is in the form of a transistor having a base electrode coupled to one of said first and second probes, an emitter electrode coupled to said voltage divider, and a collector electrode coupled to said current amplifier means.

5. The liquid level indicator apparatus of claim 1 wherein said load circuit coupled to said current amplifier means includes a signal indicator coupled to said potential source and a zener diode coupled to said potential reference level.

6. The liquid level indicator apparatus of claim 1 wherein said feedback circuit is in the form of a resistor coupling said current amplifier means to the junction of said series connected resistors of said voltage divider means.

7. Liquid level indicator apparatus including first and second containers electrically coupled to a potential reference level and having an electrically conductive fluid therein comprising:
   a potential source;
   first and second voltage divider circuits each including a resistor connected to said potential source and to a probe positioned within one of said first and second containers for developing first and second resistance values in accordance with the level of said fluid;
   voltage divider means coupling said potential source to a potential reference level;
   current amplifier means coupling said potential source to said potential reference level, said current amplifier means having an output coupled to a load circuit having an indicating device and by a feedback circuit to said voltage divider means; and
   first and second switching means coupled to said first and second voltage divider circuits respectively and to said current amplifier means and said voltage divider means whereby a shift in resistance value of one of said first and second voltage dividers, due to a shift in fluid level alters conduction of one of said switching means and said current amplifier means to activate said indicating device and feedback circuit for effecting saturation conduction of said current amplifier means.

8. The liquid level indicating apparatus of claim 7 wherein said voltage divider means includes first and second resistors series coupling said potential source to a potential reference level, said resistors having a junction coupled to each of said first and second switching means and to said feedback circuit of said current amplifier means.

9. The liquid level indicating apparatus of claim 7 wherein said first and second switching means each include a transistor coupled intermediate said current amplifier means and said voltage divider means and to one of said first and second voltage divider circuits.

10. The liquid level indicating apparatus of claim 7 wherein said output of said current amplifier means is coupled via an indicating device to said potential source and via a zener diode to said potential reference level.

* * * * *